Patented Aug. 30, 1949

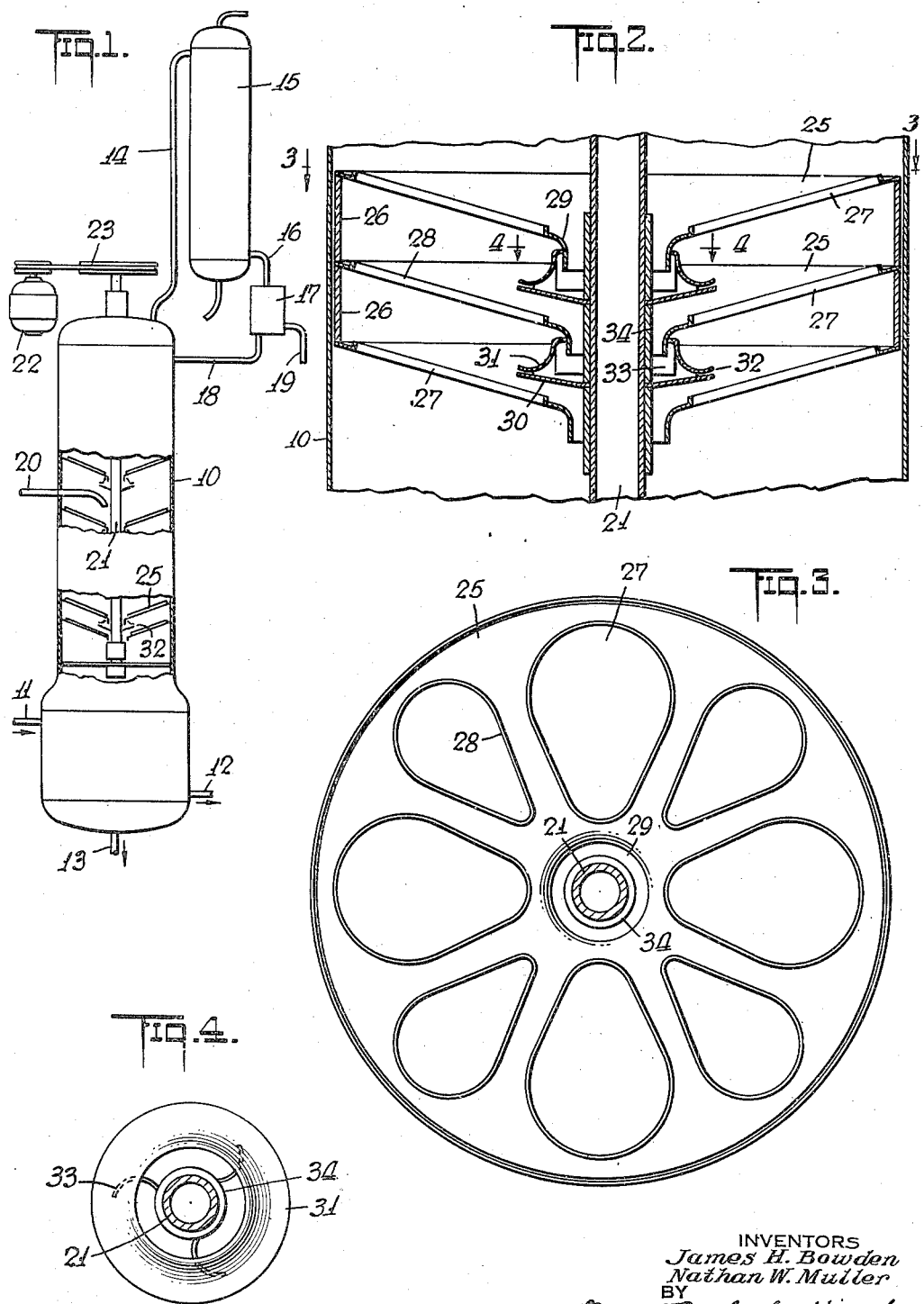

2,480,215

UNITED STATES PATENT OFFICE 2,480,215

ROTARY CONTACTOR

James H. Bowden and Nathan W. Muller, Chicago, Ill., assignors to National Cylinder Gas Company, Chicago, Ill., a corporation of Delaware Application November 10, 1945, Serial No. 627,882

1 Claim. (Cl. 261—89)

This invention relates to an apparatus for the treatment of materials in flowable form and in which such material passes downwardly through a column and is thrown out by centrifugal force from near the center toward the periphery and at vertically spaced points, a portion of the material so thrown out being collected and returned to the center.

An apparatus embodying the present invention may be used for a wide variety of purposes, as will be later pointed out. The material to be treated may be either a liquid, a mixture of liquids, or finely divided solids dispersed in a liquid, and the material treated may be altered in character in various different ways. It may be subjected to the action of an upflowing fluid which may be a liquid or a gas; it may be a volatile constituent evaporated therefrom; it may be solids in solution which are to be crystallized therefrom; it may be liquids of different specific gravity which are to be separated; and it may be a liquid containing a solid which is leached out by means of an extractant liquid. It may be employed for various other purposes, where it is desired to subject a material to some chemical or physical change while flowing through the treating apparatus. For certain uses the apparatus is an improvement on that shown and claimed in the Bottoms & Bowden Patent No. 2,387,231, granted October 23, 1945, and for other uses it performs entirely different and novel functions.

In the apparatus as illustrated there are employed a plurality of spaced downwardly dished apertured trays for the collection of liquid and the conducting of it downwardly and inwardly toward the axis of the apparatus. Such trays may be of the same character as those shown in the patent above identified or may be of various other types.

As an important feature there are employed a plurality of pockets or wells at the center of and below the dished trays and into which the trays discharge. Each such pocket or well has an annular peripheral outlet or annular series of peripheral outlets, and within each pocket or well there is provided a centrifugal impeller for throwing out through said outlet or outlets material draining into the well from the tray above, the discharge being below said tray and above the next lower tray. This is an important distinction from the apparatus shown in German Patent No. 567,111, in which the liquid flowing to the center of each tray is thrown out above the same tray.

In the accompanying drawing there is shown merely one of many possible embodiments of the invention. In the drawing, Fig. 1 is a view of a fractionated column embodying the present invention and shown in said elevation with a part of its shell broken away to expose a part of the internal structure in vertical section;

Fig. 2 is a vertical section on a larger scale, and similar to a portion of Fig. 1;

Fig. 3 is a top view plan of one of the dished trays; and

Fig. 4 is a transverse section on the line 4—4 of Fig. 2.

In Fig. 1 the invention is shown as applied to a fractionating tower or column for separating a liquid into constituents of different boiling points. In such a column the more volatile portion of the liquid ascends through the column and may be delivered to a condenser, while the less volatile constituents descend toward the bottom of the column. As illustrated, the distillation column has a vertical cylindrical shell 10 containing at the bottom a heater with an inlet 11 and an outlet 12. A discharge 13 is provided at the bottom for the less volatile liquid. At the upper end of the shell a pipe 14 conducts the volatile constituent to a condenser 15, and the condensate flows through a conduit 16 to a trap 17, from which a portion of the condensate may be returned to the upper end of the column through a pipe 18 to serve as reflux, and a portion withdrawn through a pipe 19. The liquid to be distilled is introduced into an intermediate section of the column through a feed pipe 20 having its discharge near the axis of the column. A central shaft 21 extends vertically through the column and may be rotated in any suitable manner, as for instance by an electric motor 22 and suitable drive connections 23.

The parts so far described do not constitute any portion of the invention and may be of widely varying types and forms, dependent upon the character of the fluid or other flowable material to be treated in the apparatus.

Within the shell there are provided a plurality of vertically spaced trays 25 which are downwardly and inwardly inclined or dished and are provided with apertures therethrough. As shown, each tray is of substantially the same diameter as the interior of the shell, and the trays are spaced and separated by intermediate annular collars or sleeves 26. The trays have relatively large openings 27, and around each opening there is an upstanding flange 28 so that the liquid collecting on the tray will flow around the openings and to a center portion of the shell, while a fluid passes up through the openings 27. Each tray has on its near or center portion a dependant flange or sleeve 29 encircling the shaft 21, but spaced therefrom. The particular form, shape or design of these trays may be varied widely, depending upon the character of the materials to be treated.

As an important feature of the invention there is provided between each two trays and unattached thereto a pocket or well for receiving the material draining to the center of the shell from the tray above. As shown, each of these walls has an annular bottom well 30 slightly inclined downwardly toward the shaft and an upper well 31 provided with a central aperture slightly larger than the dependant flange 29 of the tray thereabove and so positioned that the flange 29 projects into the well or pocket and delivers thereto the material being treated.

The upper and lower wells converge to form an annular discharge nozzle 32, disposed a short distance above the tray therebeneath and directing the liquid outwardly and preferably somewhat upwardly in a direction substantially parallel to the plane of the tray. Although a single annular outlet 32 may be provided, such an outlet may be subdivided into an annular series of outlets. Within each of these wells or pockets there is provided a centrifugal impeller having blades 33. The parts 30, 31 and 33 are rigidly connected and are supported on and rotated by the central shaft 21. Any suitable means may be employed for supporting and spacing them, but, as shown, they are spaced by collars or sleeves 34 which likewise may be rigidly secured to the shaft. The shaft 21 may be hollow and serve for the conducting of a heating or cooling fluid to control the temperature of the material being treated.

In the operation of the apparatus the liquid collected on each tray flows downwardly and inwardly into the pocket or well therebeneath and is thrown out centrifugally from the nozzles into the space between successive trays and beneath the tray from which the liquid so thrown out was received. A considerable portion will pass above the openings 27 in the tray beneath, and a fluid may be caused to flow upwardly through the column and thus through the films or sprays thrown out by the centrifugal impellers or pumps. In a fractionated column the fluid flowing upwardly through the openings 28 would be the vapors from the still at the bottom of the column so that there will be an intimate contact of such upflowing vapors and the downwardly flowing liquids which form the sprays, films, or jets from the impellers.

The apparatus operates in a truly countercurrent manner as the liquid travels down the column from tray to tray against the upward travel of the vapors. As the walls are normally maintained partially filled with liquid, the centrifugal impellers operate in the liquid under a positive liquid suction head and will not vapor bind when the liquid pumped is at the boiling point. The apparatus affords contact between these films of the liquid issuing from the impellers with the upwardly traveling vapor so that there is intimate contact of the liquid and the vapor while both are in suspension between successive trays.

As the shaft and the impellers may be rotated at high speed, the impellers need have only a relatively small outside diameter, and therefore they do not impede the upflow of vapors through the holes in the trays.

If the liquid to be treated contains solid or gelatinous material, or ingredients which tend to form such solids or jells, it will be noted that there is little or no liability of plugging, as the impellers positively force the material outwardly. The apparatus may be utilized for the distillation of a liquid under high vacuum because, as previously noted, the liquid is thrown out in annular films and is exposed to the maximum extent to evaporating action. By delivering a heating or cooling fluid through the shaft on which the impellers are mounted, the temperature of the descending liquors may be controlled as they flow through the narrow annular passages close to the shaft in going from one tray to the impeller therebeneath.

The apparatus may be used for contacting immiscible or only partly immiscible liquids flowing in countercurrent. The denser liquids will collect upon a tray and be delivered to the centrifugal impeller which delivers this more dense liquid in a fine annular stream or film and disperses it into a less dense fluid flowing up through the column. In some cases the centrifugal impellers may be employed to afford a mixing action, and this is important in forming emulsions as well as for liquid-liquid contact.

The apparatus may be used for the leaching or extracting of a material from a solid by means of an extractant liquid, such liquid being dispersed and brought into contact with the solid phase by means of the centrifugal impellers. By introducing fresh solids at the top they will collect on the trays and flow to the impellers which throw them out again for collection on the tray below, while fresh liquid may be introduced at the bottom of the column and flow upwardly through the openings in the trays.

The apparatus may be used for the crystallization of a solute from a solvent. The mother liquor may be brought into intimate contact with the freshly formed crystal nuclei by means of a fine dispersion of the fresh mother liquor issuing from the centrifugal impellers which carry and disperse the mother liquor. The shape, size and growth of the crystals may be controlled within close limits. It is well known that time of contact, rate of cooling and agitation are important features in controlling the rate of growth, shape and size of the crystal. By means of this apparatus all of these factors may be controlled and varied to suit the particular circumstance which applies.

The column may be maintained under high vacuum or at atmospheric pressure, or under high pressure, dependant upon the characteristics of the liquids being treated and the purpose for which the apparatus is used.

Where evaporation is desired the shell may be subjected to vacuum and the shaft internally heated. Where crystallization is desired the shaft may be cooled and have desired additional cooling applied through the outside wall.

Having thus described our invention, what we claim as new and desire to secure by Letters Patent is:

An apparatus for treating flowable materials including a vertically disposed casing having a vertical centrally disposed shaft, means for rotating said shaft at high speed, a plurality of substantially conical trays each having a plurality of comparatively large openings therethrough, an upstanding flange around each opening and a downwardly extending flange adjacent to but spaced from said shaft, a plurality of centrifugal impellers secured to said shaft between successive trays, each impeller having an upwardly and outwardly inclined bottom wall secured to said shaft, a top wall having a central opening spaced from said shaft and into which projects the downwardly extending flange of the tray thereabove, and a peripheral outlet between the juxtaposed outer edges of the top and bottom walls, whereby a gaseous fluid may flow upwardly through said casing and tray openings and liquid may be thrown out laterally over said tray openings, and liquid may collect on each tray and be directed around the tray openings and downwardly to the opening in the top wall of the impeller element.

JAMES H. BOWDEN.
NATHAN W. MULLER.

REFERENCES CITED

The following references are of record in the file of this patent:

UNITED STATES PATENTS

| Number | Name | Date |
|---|---|---|
| 945,936 | Gow | Jan. 11, 1910 |
| 1,050,013 | Fowler et al. | Jan. 7, 1913 |
| 1,862,069 | Subkow | June 7, 1932 |
| 2,048,888 | Ott | July 28, 1936 |